United States Patent Office 3,285,940
Patented Nov. 15, 1966

3,285,940
16-METHYL-$\Delta^{1,4,16}$-PREGNATRIENE-3,20-DIONE COMPOUNDS
David Taub and Robert D. Hoffsommer, Jr., Metuchen, and Norman L. Wendler, Summit, N.J., assignors to Merck & Co., Inc., Rahway, N.J., a corporation of New Jersey
No Drawing. Filed June 4, 1959, Ser. No. 818,017
4 Claims. (Cl. 260—397.45)

This invention is concerned generally with novel steroid compounds and with processes of preparing the same, more particularly, it relates to 11-oxygenated steriods of the pregnane series unsaturated in rings A and D and to novel processes for producing these steroids.

The new products of our invention may be represented by the following structural formulae:

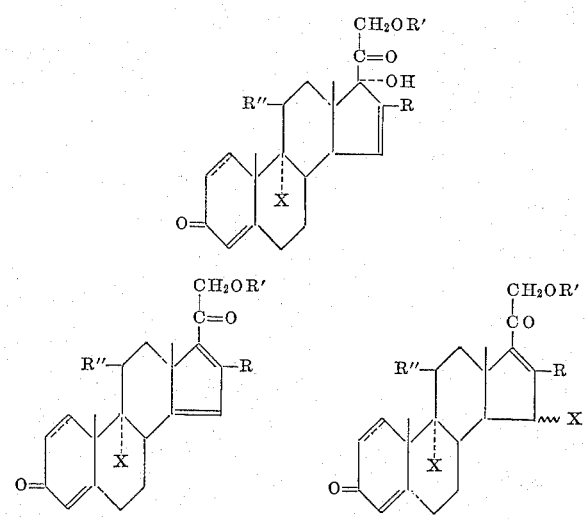

wherein R is a lower alkyl group such as methyl, ethyl, propyl or butyl, R' is hydrogen or an acyl radical of an organic carboxylic acid containing from 1 to 12 carbon atoms, inclusive, R" is hydroxy or oxygen, and X is hydrogen or halogen. The broken line between carbon atoms 1 and 2 indicates a double bond may be present in this position.

The 16-alkyl $\Delta^{15}$-steroids produced in accordance with the present invention possess high anti-inflammatory activity, considerably greater than that of the parent steroids, and are especially effective for the treatment of arthritis and related diseases since they can be administered for their cortisone-like action in low dosage thereby minimizing undesired side effects. They may also be utilized as intermediates for the preparation of other therapeutically useful steroids. For example, reduction of the $\Delta^{15}$ double bond results in the physiologically highly active 16$\beta$ and 16$\alpha$ methyl steroids. The 16-alkyl $\Delta^{14,16}$-steroids and the 16-alkyl-15-halo $\Delta^{16}$-steroids also possess useful anti-inflammatory activity and are intermediates for the preparation of other therapeutically useful steroids.

In preparing our novel chemical compounds, the starting material utilized may be an 11-oxygenated-16$\alpha$,17$\alpha$-oxido-1,4-pregnadiene-3,20-dione-21-acylate or 11-oxygenated 16$\alpha$,17$\alpha$-oxido-4-pregnene - 3,20-dione-21-acylate (prepared as described hereinbelow) which may be identified by the following structural formula:

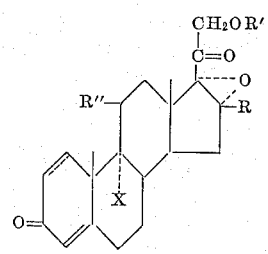

wherein X, R, R' and R" are as above.

In a specific embodiment of our invention, 9$\alpha$-fluoro-11$\beta$,21 - dihydroxy-16$\beta$-methyl-16$\alpha$,17$\alpha$-oxido-1,4-pregnadiene-3,20-dione 21-acetate which is represented by the following formula:

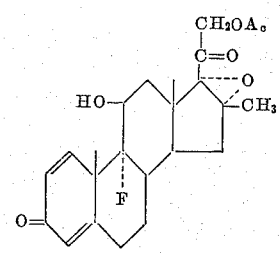

is utilized as the starting material.

It has been found that 9$\alpha$-fluoro-11$\beta$,21-dihydroxy-16$\beta$-methyl-16$\alpha$,17$\alpha$-oxido-1,4-pregnadiene-3,20-dione 21-acetate may be caused to react with hydrogen chloride in the presence of acetic acid to form a mixture of 9$\alpha$-fluoro-11$\beta$,17$\alpha$,21 - trihydroxy - 16-methyl-1,4,15-pregnatriene-3,20-dione 21-acetate (I), 9$\alpha$-fluoro-11$\beta$,17$\alpha$,21-trihydroxy-16-methylene-1,4-pregnadiene-3,20-dione 21-acetate (II), 9$\alpha$ - fluoro-11$\beta$,21-dihydroxy-16-methyl-1,4,14,16-pregnatetraene-3,20-dione 21-acetate (III), and 9$\alpha$-fluoro-15 - chloro-11$\beta$,21-dihydroxy-16-methyl-1,4,16-pregnatriene-3,20-dione 21-acetate (IV), which have the following formulae:

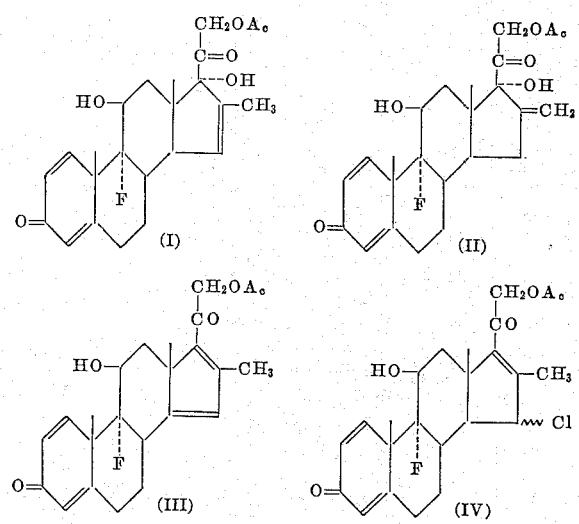

The mixture is resolved into the above four compounds by paper chromatography utilizing formamide as the stationary phase and benzene as the developing phase. Alternately, column chromatography or counter current extraction techniques may be utilized.

The oxide function of 9α-fluoro-11β,21-dihydroxy-16β-methyl - 16α,17α - oxido-1,4-pregnadiene-3,20-dione 21-acetate may be opened by reaction with other acids. Hydrogen bromide in acetic acid forms a mixture of I, II, III and the 15 bromo analog of IV. Hydrogen fluoride in tetrahydrofuran yields a mixture of I, II, III and the 15 fluoro analog of IV. Aqueous perchloric acid-dioxane yields a mixture containing primarily I and II.

The starting materials for the present process may be prepared from either of the known 16α or 16β-alkyl compounds of the following formula:

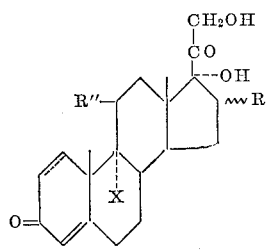

in which X, R and R'' are as above.

Treatment of either compound with semicarbazide base and semicarbazide hydrochloride leads to the corresponding 3,20-disemicarbazone of the following formula:

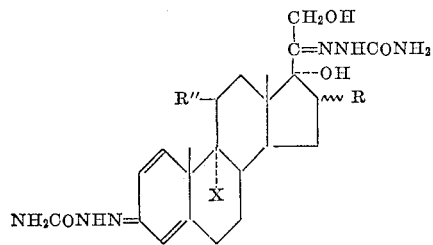

wherein R, R'' and X are as above.

The latter 3,20-disemicarbazone on heating in acetic acid and acetic anhydride is converted into the corresponding 16-unsaturated 3,20-disemicarbazone of the following formula:

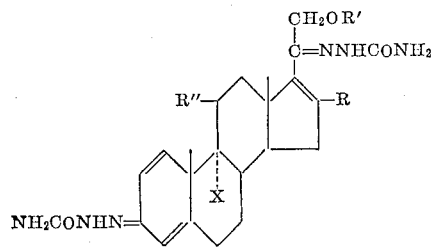

wherein R, R', R'' and X are as above.

The latter 16-unsaturated semicarbazone on treatment with hot aqueous acetic acid is converted to the corresponding 3,20-dione of the following formula:

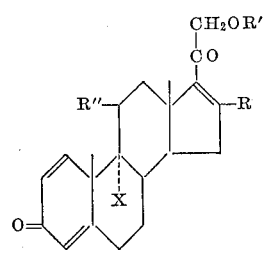

wherein R, R', R'' and X are as above.

The latter compound on treatment with an organic peroxide or organic peracid is converted into the corresponding 16α,17α-oxide starting material of the following formula:

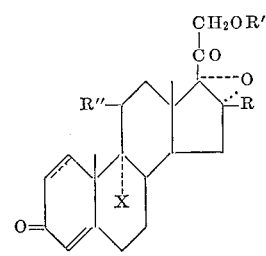

wherein R, R', R'' and X are as above.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

*Example 1.—Preparation and resolution of a mixture of 9α-fluoro - 11β,17α,21 - trihydroxy - 16 - methyl-1,4,15-pregnatriene-3,20-dione 21-acetate, 9α-fluoro-11β,17α, 21-trihydroxy - 16 - methylene - 1,4 - pregnadiene-3,20-dione 21-acetate, 9α-fluoro-11β,21-dihydroxy-16-methyl - 1,4,14,16 - pregnatetraene - 3,20 - dione 21-acetate, and 9α - fluoro-15-chloro-11β,21-dihydroxy-16-methyl-1,4,16-pregnatriene-3,20-dione 21-acetate*

To 200 mg. of 9α-fluoro-11β,21-dihydroxy-16β-methyl-16α,17α-oxido-1,4-pregnadiene - 3,20 - dione 21 acetate (prepared as described hereinbelow) in 10 ml. of acetic acid is added 10 ml. of 5% hydrogen chloride in acetic acid. After 5 minutes, the mixture is concentrated to dryness in vacuo, flushed with benzene and again concentrated to dryness.

Paper chromatography of the residue utilizing formamide as the stationary phase and benzene as the developing phase resolves the reaction mixture into four substances:

9α-fluoro-11β,17α,21-trihydroxy-16-methyl-1,4,15-pregnatriene-3,20-dione 21-acetate;

9α-fluoro-11β,17α,21-trihydroxy-16-methylene-1,4-pregnadiene-3,20-dione 21-acetate;

9α-fluoro-11β,21-dihydroxy-16-methyl-1,4,14,16-pregnatetraene-3,20-dione 21-acetate and 9α-fluoro-15-chloro-11β,21-dihydroxy-16-methyl-1,4, 16-pregnatriene-3,20-dione 21-acetate, respectively. 9α-fluoro - 11β,17α,21 - trihydroxy-16-methyl-1,4,15-pregnatriene-3,20-dione 21-acetate is obtained from the second most polar of the bands which is cut from the paper. The steroid is eluted from the paper by means of methanol. Concentration of the methanol to dryness in vacuo and crystallization of the residue from acetone-ether gives 9α-fluoro - 11β,17α,21 - trihydroxy - 16 - methyl-1,4,15-pregnatriene-3,20-dione 21-acetate which is effective for the treatment of arthritis and and related diseases.

From the third and fourth bands by similar treatment are obtained respectively 9α-fluoro-11β,21-dihydroxy-16-methyl-1,4,14,16-pregnatetraene-3,20-dione 21-acetate and 9α-fluoro-15-chloro - 11β,21 - dihydroxy-16-methyl-1,4,16-pregnatriene-3,20-dione 21-acetate.

When the reaction is carried out utilizing 5% hydrogen bromide in acetic acid 9α-fluoro-15-bromo-11β,21-dihydroxy - 16 - methyl - 1,4,16 - pregnatriene-3,20-dione 21-acetate is obtained from the fourth band. When the reaction is carried out in tetrahydrofuran utilizing hydrogen fluoride as the acid reagent 9α,15-difluoro-11β,21-dihydroxy - 16 - methyl - 1,4,16 - pregnatriene-3,20-dione 21-acetate is obtained from the fourth band.

The 9α - fluoro-11β,21-dihydroxy-16β-methyl-16α,17α-oxido-1,4-pregnadiene-3,20-dione 21-acetate used as a starting material in this example, is prepared starting with the known 9α-fluoro-11β,17α,21-trihydroxy-16α-methyl-1,4-pregnadiene-3,20-dione in accordance with the following procedure:

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α-fluoro - 11β,17α,21 - trihydroxy-16α-methyl-1,4-pregnadiene-3,20-dione is filtered, washed with water, and dried in air;

M.P. over 300° $\lambda_{max.}^{CH_3OH}$ 292 m$\mu$, $E_m$ 25,500; 240 m$\mu$, $E_m$ 21,400

A solution of 500 mg. of the 3,20-disemicarbazone of 9α-fluoro - 11β,17α,21 - trihydroxy-16α-methyl-1,4-pregnadiene-3,20-dione in 10 ml. of acetic acid and 0.5 ml. acetic anhydride is refluxed under nitrogen for one hour to produce the corresponding 3,20-disemicarbazone of 9α-fluoro - 11β,21 - dihydroxy-16-methyl-1,4,16-pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy - 16 - methyl-1,4,16-pregnatriene-3,20 dione 21-acetate;

M.P. 228–233° $\lambda_{max.}^{MeOH}$ 243 m$\mu$ $E_m$ 22,000

To a stirred solution of 510 mg. of 9α-fluoro-11β,21-dihydroxy - 16 - methyl - 1,4,16 - pregnatriene-3,20-dione 21-acetate in 15 ml. of methylene dichloride is added 10 g. of disodium hydrogen phosphate. The mixture is cooled to 0° and 2.5 mol of a 2 M solution of peroxytrifluoracetic acid in methylene chloride [prepared from 0.40 ml. of 90% hydrogen peroxide and 2.54 ml. of trifluoracetic anhydride in 2.50 ml. of methylene chloride] is added. The mixture is kept at room temperature for one hour. Water is added and the mixture is extracted with methylene chloride. The methylene chloride extract is washed with water, dried over magnesium sulfate and concentrated to dryness. Crystallization of the residue from acetone-ether gives 9α-fluoro-11β,21-dihydroxy-16β-methyl - 16α,17α - oxido-1,4-pregnadiene-3,20-dione 21-acetate M.P. 227–230° $\lambda_{max.}^{MeOH}$ 237 m$\mu$, $E_m$ 15,100

In a similar manner may be obtained the 16β-methyl-16α,17α-oxides of prednisolone 21-acetate, prednisone 21-acetate, 9α-fluorohydrocortisone 21-acetate, hydrocortisone 21-acetate, cortisone 21-acetate etc. By treating the respective 16α,17α-oxides with hydrogen chloride in acetic acid as described above there may be obtained:

11β,17α,21-trihydroxy-16-methyl-1,4,15-pregnatriene-3,20-dione 21-acetate;
17α,21-dihydroxy-16-methyl-1,4,15-pregnatriene-3,11,20-trione 21-acetate;
9α-fluoro-11β,17α,21-trihydroxy-16-methyl-4,15-pregnadiene-3,20-dione 21-acetate;
11β,17α,21-trihydroxy-16-methyl-4,15-pregnadiene-3,20 dione and 17α,21 - dihydroxy-16-methyl-4,15-pregnadiene-3,11,20-trione. The corresponding 16-methyl $\Delta^{14,16}$ and 16-methyl-15-halo $\Delta^{16}$ steroids are also obtained as shown above.

*Example 2.—Preparation of 9α-fluoro-11β,17α-21-trihydroxy-16-methyl-1,4,15-pregnatriene-3,20-dione*

This compound is obtained by treatment of 100 mg. of the corresponding 21-acetate (obtained as described in Example 1) in 5 ml. of methanol with 100 mg. of potassium bicarbonate in 2 ml. of water under nitrogen at reflux for 7 minutes. The mixture is cooled, neutralized with 10% aqueous acetic acid, the methanol removed in vacuo and the product extracted into ethyl acetate. Concentration of the ethyl acetate gives crystalline 9α-fluoro-11β,17α,21 - trihydroxy - 16-methyl - 1,4,15-pregnatriene-3,20-dione.

In a similar manner may be obtained

11β,17α,21-trihydroxy-16-methyl-1,4,15-pregnatriene-3,20-dione;
17α,21-dihydroxy-16-methyl-1,4,15-pregnatriene-3,11,20-trione;
9α-fluoro-11β,17α,21-trihydroxy-16-methyl-4,15-pregnadiene-3,20-dione;
11β,17α,21-trihydroxy-16-methyl-4,15-pregnadiene-3,20-dione and
17α,21-dihydroxy-16-methyl-4,15-pregnadiene-3,11,20-trione.

*Example 3.—Preparation of 9α-fluoro-11β,17α,21-trihydroxy - 16 - methyl-1,4,15-pregnatriene-3,20-dione 21-t-butyl-acetate*

To a stirred solution of 50 mg. of 9α-fluoro-11β,17α,21-trihydroxy-16-methyl-1,4,15-pregnatriene-3,20-dione (the product of the previous example) in 0.5 ml. of pyridine at 10° C. is added 0.3 ml. of t-butylacetyl chloride. After two hours at 25° water is added and the precipitated product filtered, washed with dilute hydrochloric acid, dilute sodium bicarbonate solution, water and dried in air.

In a similar manner may be obtained the 21-t-butyl acetates of

11β,17α,21-trihydroxy-16-methyl-1,4,15-pregnatriene-3,20-dione;
17α,21-dihydroxy-16-methyl-1,4,15-pregnatriene-3,11,20-trione;
9α-fluoro-11β,17α,21-trihydroxy-16-methyl-4,15-pregnadiene-3,20-dione;
11β,17α,21-trihydroxy-16-methyl-4,15-pregnadiene-3,20-dione and
17α,21-dihydroxy-16-methyl-4,15-pregnadiene-3,11,20-trione.

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:

1. A compound selected from the group consisting of:

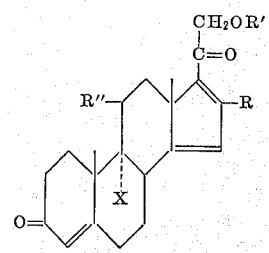

and the $\Delta^1$ derivatives thereof wherein R is lower alkyl, R' is selected from the group consisting of hydrogen and acyl, R" is selected from the group consisting of hydroxy and oxygen and X is selected from the group consisting of hydrogen and halogen.

2. A compound selected from the group consisting of:

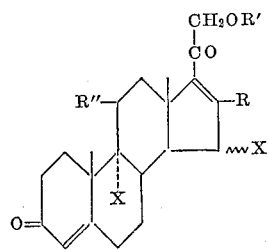

and the Δ¹ derivatives thereof wherein R is lower alkyl, R' is selected from the group consisting of hydrogen and acyl, R" is selected from the group consisting of hydroxy and oxygen and X is selected from the group consisting of hydrogen and halogen.

3. 9α - fluoro - 11β,21-dihydroxy-16-methyl-1,4,14,16-pregnatetraene-3,20-dione 21-acetate.

4. 9α - fluoro - 15-chloro-11β,21-dihydroxy-16-methyl-1,4,16-pregnatriene-3,20-dione 21-acetate.

No references cited.

LEWIS GOTTS, *Primary Examiner.*

E. ROBERTS, *Assistant Examiner.*